(12) United States Patent  (10) Patent No.: US 8,731,289 B2
Straub  (45) Date of Patent: May 20, 2014

(54) RECOLORING IMAGES OF A WEB PAGE ACCORDING TO A REPRESENTATIVE COLOR

(71) Applicant: Oracle International Corporation, Redwood Shores, CA (US)

(72) Inventor: Christian David Straub, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 64 days.

(21) Appl. No.: 13/633,451

(22) Filed: Oct. 2, 2012

(65) Prior Publication Data

US 2014/0093167 A1  Apr. 3, 2014

(51) Int. Cl.
*G06K 9/00* (2006.01)
*G06T 5/00* (2006.01)

(52) U.S. Cl.
CPC ........................... *G06T 5/001* (2013.01)
USPC ........................... 382/167; 382/162; 382/164

(58) Field of Classification Search
CPC ......... G06T 5/001; G06T 5/40; G06T 11/001; G06T 7/408; G06T 7/0081; G06T 2007/10024; H04N 1/6027; H04N 9/045; H04N 1/60; H04N 1/6058; G06K 9/4652; G06K 9/38
USPC .................. 382/162, 164, 167; 345/589, 593; 358/518, 520, 530, 538; 707/999.102, 707/E7.116; 1/1; 715/205, 234, 760
See application file for complete search history.

(56) References Cited

U.S. PATENT DOCUMENTS 5,473,736 A * 12/1995 Young ........................... 345/593
5,841,898 A * 11/1998 Liguori ......................... 382/164
8,085,276 B2 * 12/2011 Voliter et al. .................. 345/589

* cited by examiner

*Primary Examiner* — Anh Do
(74) *Attorney, Agent, or Firm* — Miles & Stockbridge P.C.

(57) ABSTRACT

A system for recoloring a set of images of a web page according to a determined representative color. The system receives at least one image that is to be recolored from a first color scheme to a second color scheme, wherein the first color scheme comprises a plurality of first colors, the second color scheme comprises a plurality of second colors, and each of the plurality of first colors is associated to one of the plurality of second colors. The system assigns a representative color to each of the pixels of the image, wherein the representative colors are chosen from the plurality of first colors. The system recolors pixels of the image to correspond to the plurality of second colors, wherein each recolored pixel is recolored according to a second color that is associated with the representative color that was assigned to the recolored pixel.

20 Claims, 5 Drawing Sheets

RECOLORING IMAGES OF A WEB PAGE ACCORDING TO A REPRESENTATIVE COLOR

FIELD

One embodiment is directed generally to a computer system, and in particular to a computer system that generates a web page.

BACKGROUND INFORMATION

Web pages are generally understood as documents that are accessed through a browser and displayed to a viewer. Web pages usually include information about the text, backgrounds, and images presented to the viewer. The designer/user of a web page may design the web page in a specific manner to convey a particular message to the viewer. When designing the web page, the user may use a combination of typography, visual arts, and page layout techniques to arrange the elements of the webpage to convey the desired message.

With regard to using visual-arts techniques, the user will often consider the placement and composition of various visual elements of the webpage. Visual elements include elements such as lines, shapes, colors, textures, forms, shading values, and spacing.

When determining the color elements, the user often gives special consideration to how color attributes such as hue, brightness, and saturation affect the presentation and perception of the web page. For example, the user may use different colors to evoke different moods within the viewer. Further, the user may use specific colors to identify brands or logos. After a web page is created and the colors are defined, the user may still wish to periodically change the colors of the web page in response to changing needs.

SUMMARY

One embodiment is a system for recoloring a set of images of a web page according to a determined representative color. The system receives at least one image that is to be recolored from a first color scheme to a second color scheme, wherein the first color scheme comprises a plurality of first colors, the second color scheme comprises a plurality of second colors, and each of the plurality of first colors is associated to one of the plurality of second colors. The system assigns a representative color to each of the pixels of the image, wherein the representative colors are chosen from the plurality of first colors. The system recolors pixels of the image to correspond to the plurality of second colors, wherein each recolored pixel is recolored according to a second color that is associated with the representative color that was assigned to the recolored pixel.

DETAILED DESCRIPTION

One embodiment is a system for recoloring images of a webpage. The system receives at least one image that is to be recolored from a first color scheme to a second color scheme. The system recolors each pixel of the image from the first color scheme to the second color scheme, depending upon an assigned representative color of each pixel. As such, embodiments of the present system allow users to perform dynamic styling of their websites while also preserving the functionality of colors of the first color scheme. Users can change the colors of the web pages on the fly when customizing their web pages.

A variety of web page products are available for sale to customers/users. In one example, a web page product may include a set of images that combine to form a web page. These images may be initially colored using default colors. However, upon purchasing the web page product, the user may wish to modify the default colors of the images to better suit the user's needs.

For example, if the designer/user of the web page is a corporate entity, the user may wish to use a new color scheme that includes a specific plurality of colors that matches their corporate colors. For example, a company like the Coca-Cola Company may prefer a color scheme that includes mostly red colors as opposed to mostly blue colors. Therefore, the user of the web page may wish to change the color scheme applied to the images from a first color scheme to a second color scheme (e.g., to recolor the images of a website from default shades of blue to different shades of red).

In previous methods for recoloring images, designers would use graphic design tools (e.g., Photoshop) to apply hue or saturation filters over every image. When these filters are applied over the images, the designers would primarily modify the overall hue or saturation levels of the images, without specifying any individual colors to apply to the images.

However, when a general hue/saturation filter is applied over all of the images of a web page, as performed by the previous methods, the functional purposes of certain colors within the images may be lost. For example, suppose a user uses two specific colors within images of a web page: (1) a general background color that is a dark blue, and (2) a strong highlight color that is a lighter shade of blue. Next, suppose that the user wishes to recolor the images to a different color scheme that includes different shades of black as opposed to different shades of blue. If the user recolors the images to the black color scheme by applying a hue filter over all of the images to change the blue color scheme to the black color scheme, the resulting images would have a black color as the background, and a slightly lighter gray color as the highlight color. However, the slightly lighter gray highlight color of the resulting images may not adequately perform the function of highlighting visual elements, as compared to the original blue highlighting color.

In another previous method for recoloring images, a user would provide metadata about the pixels of each image to provide additional data regarding the function of each pixel. However, this approach is very taxing because a user would typically be required to spend many hours to add the metadata for each pixel of each image. Further, if an image with associated metadata changes, the user would typically need to provide modified metadata for the changed image.

In contrast to the previous approaches, embodiments of the present system assign an appropriate representative color (chosen from a plurality of first colors of a first color scheme) to each of the pixels of at least one image of a web page. An association exists between the plurality of first colors (of the first color scheme) and a plurality of second colors (of a second color scheme). The system then recolors each pixel of the at least one image into the second color scheme in accordance to the assigned representative colors of each pixel. As such, certain embodiments allow a user to recolor images from a first color scheme to second color scheme while maintaining the functional purposes accomplished by the colors of the first color scheme.

Certain embodiments allow users to choose colors by function. For example, certain embodiments allow a user to specifically choose a desired background color and to specifically choose a different highlight color. The user is able to choose "black" as the background color and "orange" as the highlight color for the second color scheme. Certain embodiments also allow users to perform dynamic styling of their web pages without requiring any specific knowledge of what purpose the images serve. As such, the recoloring of images from a first color scheme to a second color scheme can be performed as an automated task.

Figure 1:
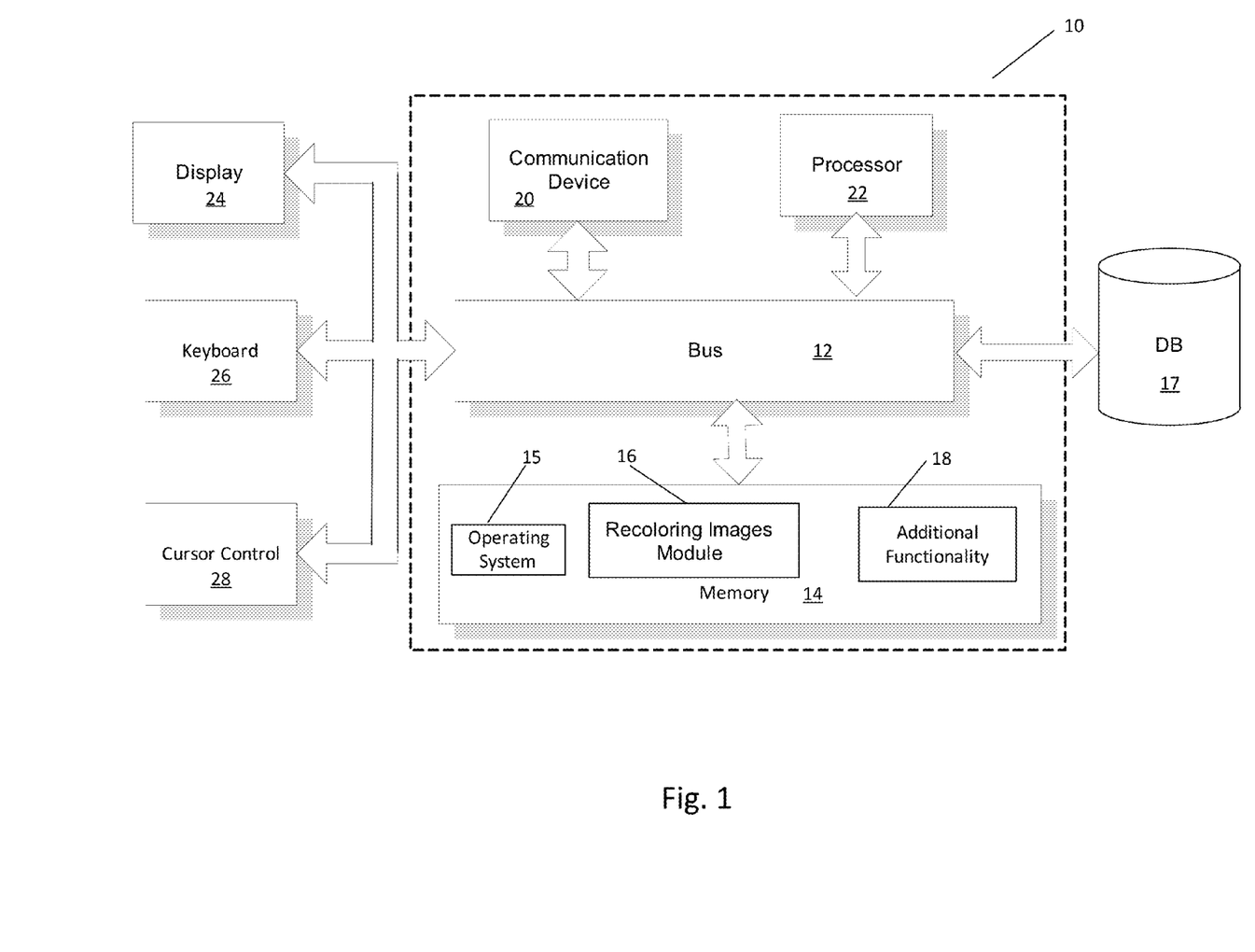
FIG. 1 is an overview block diagram of a computer system for recoloring images in accordance with an embodiment of the present invention.

FIG. 1 is an overview block diagram of a computer system 10 for recoloring a set of images in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 may be further coupled via bus 12 to a display 24, such as a Liquid Crystal Display ("LCD"). A keyboard 26 and a cursor control device 28, such as a computer mouse, may be further coupled to bus 12 to enable a user to interface with system 10.

In one embodiment, memory 14 stores software modules that provide functionality when executed by processor 22. The modules include an operating system 15 that provides operating system functionality for system 10. The modules further include recoloring images module 16 for a system for recoloring images according to a determined representative color, as disclosed in more detail below. System 10 can be part of a larger system. Therefore, system 10 will typically include one or more additional functional modules 18 to include additional functionality, such as data processing functionality for generating a recolored set of images and for generating a representative color. A database 17 is coupled to bus 12 to store data used with modules 16 and 18.

In one embodiment, a standard set of predetermined colors (e.g., fifteen colors) is used as a plurality of first colors of a first color scheme. The system then assigns a representative color (chosen from the set of predetermined colors of the first color scheme) to each of the pixels of at least one image of a web page.

Assigning an appropriate representative color to each of the pixels of the at least one image may be challenging because the color information of a given pixel of the image may not exactly match any of the predetermined colors. For example, a given pixel may have a gradient or a hue that does not match any of the predetermined colors. As such, certain embodiments determine which color of the predetermined colors is a preferred representative color for the given pixel.

To determine the preferred representative color of each of the pixels of the at least one image, pixel-color-distance calculations are performed on the pixels of the image. Specifically, for each pixel of the image, the system determines the color of the pixel and calculates which color of the predetermined colors that the pixel is closest to. The following calculations are performed between each pixel of the image and each color of the predetermined colors:

Color distance (between a pixel of the image and a color of the predetermined colors)=square root of $(redDelta^2+greenDelta^2+blueDelta^2)$;

Red Delta is defined as follows: red Delta=(the red density of a color of the predetermined colors)−(the red density of a pixel of the image);

GreenDelta is defined as follows: greenDelta=(the green density of a color of the predetermined colors)−(the green density of a pixel of the image);

BlueDelta is defined as follows: blueDelta=(the blue density of a color of the predetermined colors)−(the blue density of a pixel of the image).

In one embodiment, the above set of calculations is performed on each pixel of the image and for each of the predefined colors. If the color distance between a pixel of the image and a predetermined color is within a threshold value, the distance is recorded for future reference, and the predetermined color becomes a candidate for being the representative color of the pixel. After all of the above calculations are performed between a pixel of the image and for each of the predetermined colors, the predetermined color with the shortest color distance to the pixel of the image is determined to be the representative color for that pixel.

After the representative colors for the pixels are determined, recoloring of the pixels to correspond to second colors of a second color scheme may begin. To recolor the pixels of the images from the first color scheme to correspond to the second color scheme, a user may manually modify each color of the predetermined colors. As such, an association (i.e., a before-and-after association) exists between the newly applied colors and the earlier predetermined colors. When a color of the predetermined colors (i.e., a color of the first color scheme) is modified by the user, the pixels of images having the predetermined color as a representative color are also changed to reflect the newly modified color (i.e., changed to reflect the second color scheme).

In one embodiment, recoloring of a pixel also includes removing any transparency value from the pixel and storing the transparency value for later processing.

Additionally, a luminance value of the pixel is calculated according to the following equation:

luminance=(0.299×red value of pixel color)+(0.587+green value of pixel color)+(0.114×blue value of pixel color)

Next, the newly modified color (i.e., the color corresponding to the second color scheme) is applied to the pixel. The value of the newly modified color of the pixel is determined according to the following equations:

New red contribution to pixel=(modified color red amount)×(luminance);

New blue contribution to pixel=(modified color blue amount)×(luminance);

New green contribution to pixel=(modified color green amount)×(luminance).

Finally, the previously removed transparency value is reapplied to the pixel along with the newly modified color value. After all of the pixels of the image have been processed in the manner described above, the image is then considered to be recolored to the desired second color scheme.

In the end, the system recolors the pixels of the image into new modified color values that resemble, but do not necessarily exactly match, the modified colors selected by the user (i.e., the second color scheme). The applied modified color values do not exactly match the colors selected by the user because the colors selected by the user are further adjusted in accordance to the luminance of the pixel before they are applied to the pixel, as described above.

As a result of adjusting for luminance, the new modified color values of the pixels preserve relative brightness, hue, and saturation properties as compared to pixels before recoloring. As such, once all of the images of the web page are assembled, the functions of each of the colors remain intact (e.g., the lighter parts of the original web page also look lighter in the finally assembled web page).

Figure 2:
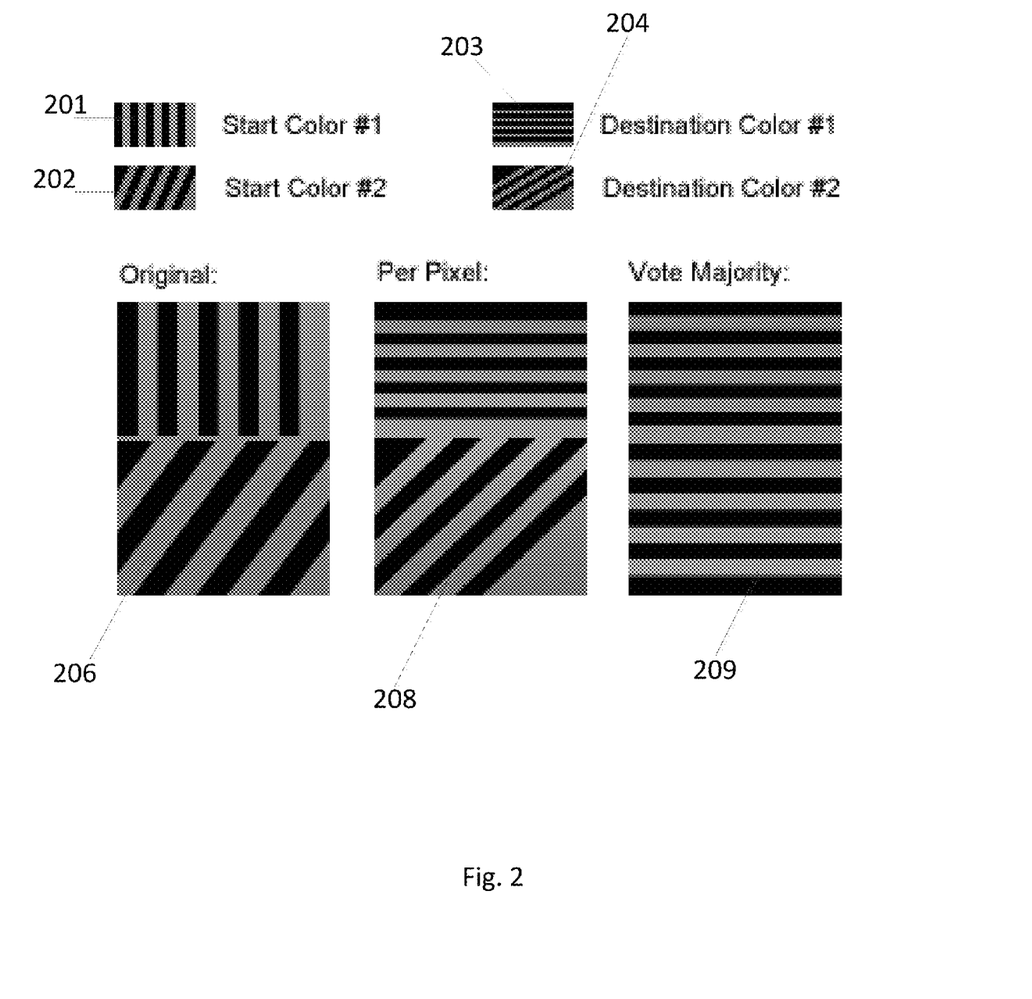
FIG. 2 illustrates recoloring pixels of an image according to an overall representative color of the image in accordance with one embodiment.

FIG. 2 illustrates recoloring pixels of an image 206 according to an overall representative color of the image in accordance with one embodiment. In addition to assigning a representative color to each pixel of an image, in another embodiment, an overall representative color can be assigned to the image as a whole. For example, each time a predetermined color is determined to be the shortest distance to a particular pixel color of the image, the predetermined color receives one vote. Upon performing the color-distance calculations on all of the pixels of the image, whichever of the predetermined colors that receives the most votes is then considered to be the overall representative color of the image itself.

Certain embodiments may recolor the pixels of an image according to an overall representative color of the image in order to avoid certain unexpected and undesirable results that occur if the pixels of the image are individually recolored in isolation from each other. For example, referring to FIG. 2, suppose an original image 206 comprises pixels of first start color 201 and second start color 202 (the two different striped patterns represent two different colors). Suppose that original image 206 is an image that displays a gradient from first start color 201 to second start color 202, from the top to the bottom of original image 206.

Further, suppose that first start color 201 is recolored to be first destination color 203, and second start color 202 is recolored to be second destination color 204. If the pixels of original image 206 are individually recolored in isolation from each other, then original image 206 would then become recolored image 208. However, recolored image 208 may not accurately represent the gradient between first start color 201 and second start color 202 of original image 206.

As such, certain embodiments may determine that the pixel colors of original image 206 generally correspond to an overall representative color (e.g., the overall representative color may be first start color 201). Certain embodiments may recolor all pixels of original image 206 in accordance to the overall representative color. Upon recoloring the pixels of original image 206 in accordance to the overall representative color (i.e., first start color 201), original image 206 is recolored to be recolored image 209, instead of recolored image 208. Recolored image 209 may be an image that more accurately represents a recolored gradient between first start color 201 and second start color 202 of original image 206.

Figure 3:
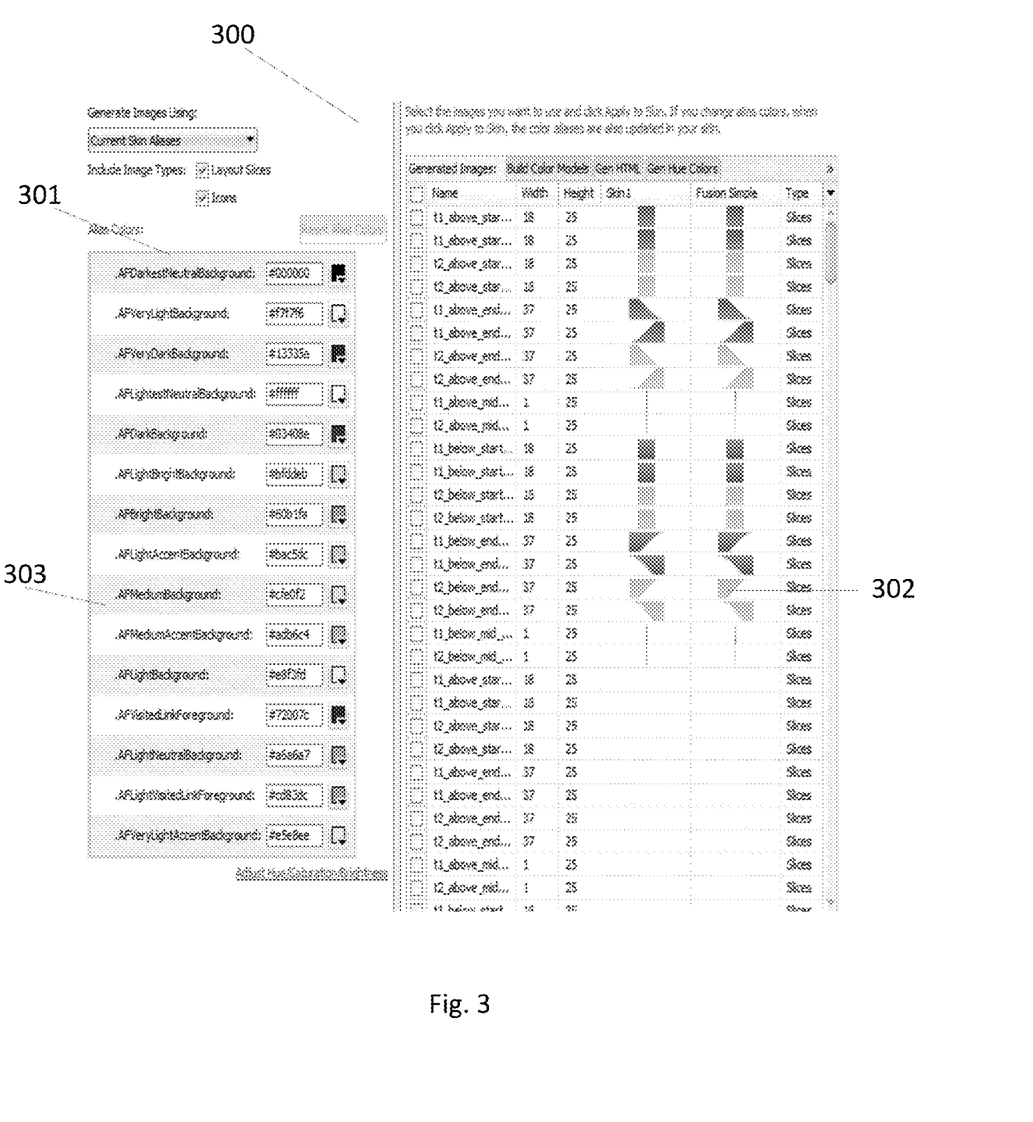
FIG. 3 is a screen shot of an interface that allows selecting of colors for a second color scheme in accordance with one embodiment.

FIG. 3 is a screen shot of an interface 300 that allows selecting of colors 301 for a second color scheme in accordance with one embodiment. As described above, each of the pixels of the images is assigned a representative color. Colors 301 are currently set as the default colors (i.e., colors of colors scheme 1). As shown in FIG. 3, pixels of image "t2_below_end.png" (as shown as image 302 in FIG. 3) is assigned an original, representative color of "AFMediumBackground" (as shown as color 303 in FIG. 3). Therefore, if the user subsequently modifies the "AFMediumBackground" color 303 using interface 300, then the colors of pixels within "t2_below_end.png" image 302 should also be changed in accordance to the newly modified color. As such, certain embodiments determine a starting representative color for pixels of an image so that the system can subsequently recolor the pixels of the image upon modification of the representative color.

Figure 4:
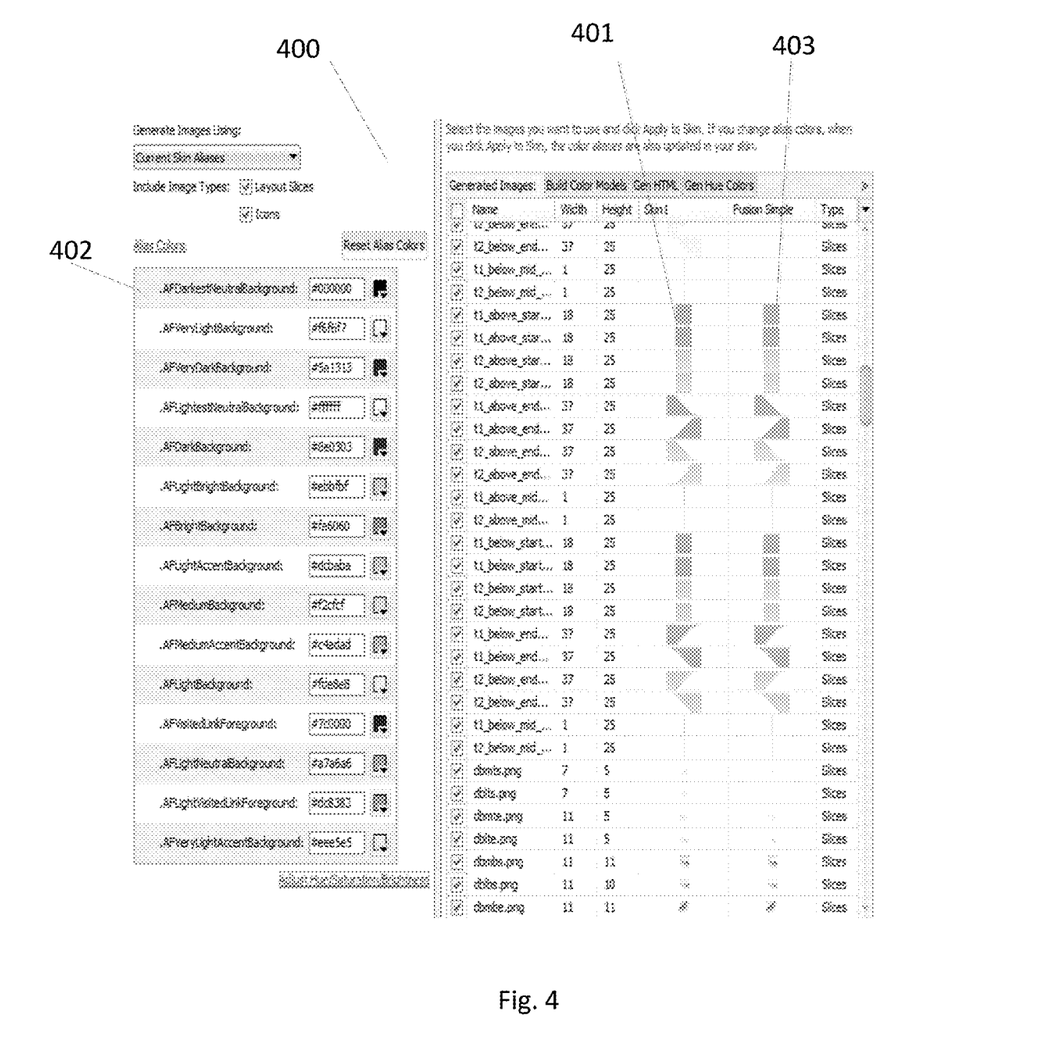
FIG. 4 is a screen shot of an interface showing recolored images in accordance with one embodiment.

FIG. 4 is a screen shot of an interface 400 showing recolored images 401 in accordance with one embodiment. The owner may modify colors of the predetermined colors 402 by selecting desired new colors via interface 400. In FIG. 4, the user has changed predetermined colors 402 to match a different color scheme (e.g., by changing the plurality of predetermined colors from a blue color scheme to a red color scheme). Also, upon selecting new desired colors for colors 402, interface 400 provides a preview of the changed images 401. Interface 400 provides a preview of a column of images 401 that will be changed in accordance to the new color scheme (i.e., images 401 are displayed using a new "red" color scheme, and images 403 are displayed using the original "blue" color scheme). Images 401 within the 4th column "Skin1" of the interface 400 have been updated from the previous set of images 403 that reflected the original predetermined colors (as shown in the 5th column "Fusion Sample") to be more red instead of blue.

In another embodiment, if two adjacent images (i.e., a first and second image) are assigned different representative colors, the system performs additional processing for the two adjacent images. The system determines the color distances between the pixels of the second image and the representative color of the first image. The system also determines the color distances between the pixels of the first image and the representative color of the second image. Whichever representative color has the shortest distance will then be used as the representative color for both the first and second images. As described above, such processing using representative colors may more accurately represent gradients (i.e., where a color may be darker than a starting color, but still needs to be adjusted in relation to that starting color to match surrounding images). The representative color for both the first and second images may be used to recolor both images to accurately represent a gradient between the two images.

Figure 5:
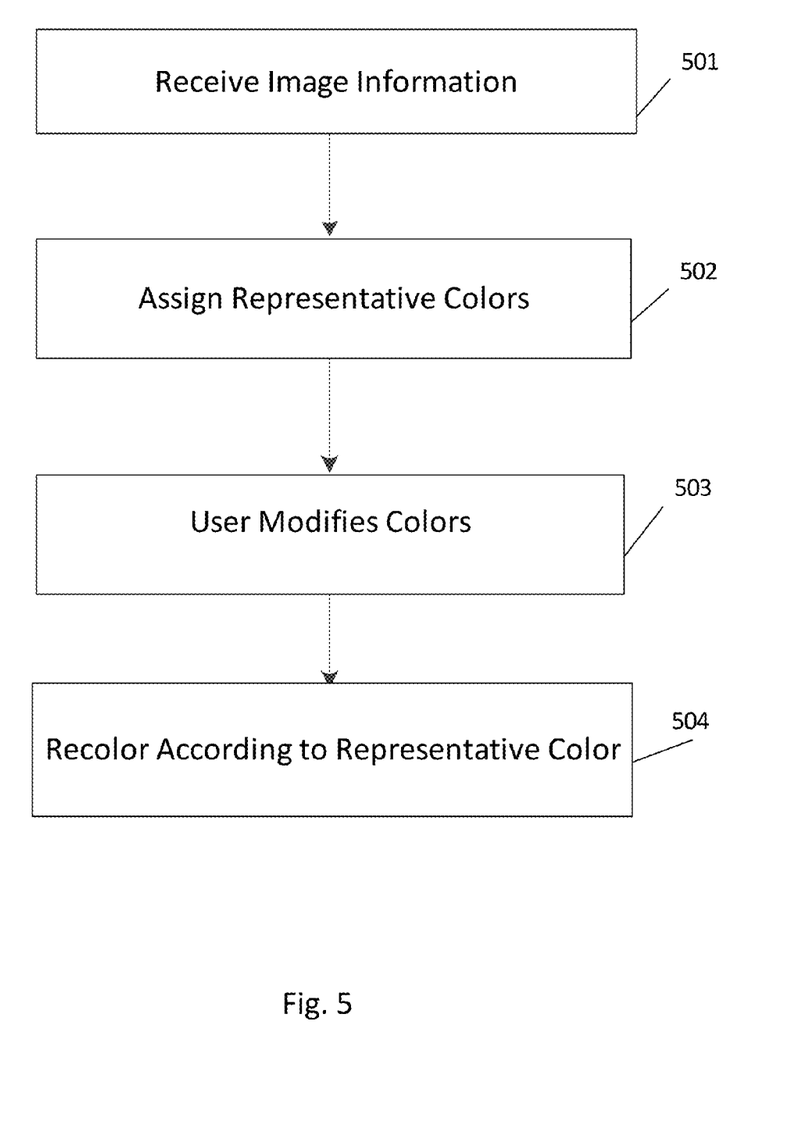
FIG. 5 is a flow diagram of the functionality of the recoloring images module of FIG. 1 in accordance with one embodiment.

FIG. 5 is a flow diagram of the functionality of the recoloring images module 16 of FIG. 1 in accordance with one embodiment. In one embodiment, the functionality of the flow diagram of FIG. 5 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 501, the system receives at least one image that is to be recolored from a first color scheme to a second color scheme. The at least one image (e.g., an image among images 403 as shown in FIG. 4) may be combined with other images to form a web page.

At 502, the system assigns a representative color to each pixel of the received image. To determine the representative color (e.g., a color among colors 301 of FIG. 3) of each of the pixels of the received image, pixel-color-distance calculations are performed between the pixels of the image and predetermined colors. As previously described, the system may also perform pixel voting to assign a representative color to the overall image as a whole.

At 503, the user modifies the colors of the pixels, if desired. The user can decide to change each of the predetermined colors (e.g., each of colors 402 of FIG. 4) to match a different color scheme.

At 504, the pixels represented by the modified predetermined color are also changed according to the newly modified color (as illustrated by the difference between images 401 and 403 of FIG. 4).

As disclosed, certain embodiments are directed to a system for recoloring images of a webpage. The system receives at least one image that is to be recolored from a first color scheme to a second color scheme. The first color scheme and the second color scheme each contain a plurality of colors. The colors of the first color scheme are associated with the colors of the second color scheme. The system assigns a representative color from the colors of the first color scheme to each pixel of the at least one image. The system then recolors each pixel of the at least one image from the first color scheme to the second color scheme, based upon whether the representative color of the pixel was modified. As such, embodiments of the present system allow users to perform dynamic styling of their websites while also preserving the functionality of colors of the first color scheme. Users can change the colors of the web pages on the fly when customizing their web pages.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer readable medium having instructions stored thereon that, when executed by a processor, causes the processor to recolor a set of images of a web page according to a determined representative color, the recoloring comprising:

receiving at least one image that is to be recolored from a first color scheme to a second color scheme, wherein the first color scheme comprises a plurality of first colors, the second color scheme comprises a plurality of second colors, and each of the plurality of first colors is associated to one of the plurality of second colors;

assigning a representative color to each of the pixels of the image, wherein the representative colors are chosen from the plurality of first colors; and recoloring pixels of the image to correspond to the plurality of second colors, wherein each recolored pixel is recolored according to a second color that is associated with the representative color that was assigned to the recolored pixel.

2. The computer readable medium of claim 1, wherein assigning a representative color to each of the pixels of the image comprises calculating color distances between a color of each pixel of the image and each color of the plurality of first colors, and wherein the first color that has the shortest color distance to a color of a pixel is determined to be the representative color of the pixel.

3. The computer readable medium of claim 1, wherein recoloring pixels of the image to the plurality of second colors comprises calculating a luminance value of each pixel of the image, and wherein each recolored pixel is recolored in accordance to the luminance value of the pixel and the second color of the pixel.

4. The computer readable medium of claim 1, wherein the plurality of first colors of the first color scheme are a plurality of default colors.

5. The computer readable medium of claim 1, wherein the plurality of second colors of the second color scheme are determined by a user.

6. The computer readable medium of claim 1, the recoloring further comprising providing a preview of recoloring the image from the first color scheme to the second color scheme via an interface.

7. The computer readable medium of claim 1, the recoloring further comprising voting for an overall representative color for the image, wherein, each time a first color is chosen as a representative color for a pixel of the image, the chosen first color receives a vote to be the overall representative color for the image, and whichever first color receives the most votes is determined to be the overall representative color for the image.

8. A method for recoloring a set of images of a web page according to a determined representative color, the method comprising:

receiving at least one image that is to be recolored from a first color scheme to a second color scheme, wherein the first color scheme comprises a plurality of first colors, the second color scheme comprises a plurality of second colors, and each of the plurality of first colors is associated to one of the plurality of second colors;

assigning by a processor a representative color to each of the pixels of the image, wherein the representative colors are chosen from the plurality of first colors; and recoloring by the processor pixels of the image to correspond to the plurality of second colors, wherein each recolored pixel is recolored according to a second color that is associated with the representative color that was assigned to the recolored pixel.

9. The method of claim 8, wherein assigning a representative color to each of the pixels of the image comprises calculating color distances between a color of each pixel of the image and each color of the plurality of first colors, and wherein the first color that has the shortest color distance to a color of a pixel is determined to be the representative color of the pixel.

10. The method of claim 8, wherein recoloring pixels of the image to the plurality of second colors comprises calculating a luminance value of each pixel of the image, and wherein each recolored pixel is recolored in accordance to the luminance value of the pixel and the second color of the pixel.

11. The method of claim 8, wherein the plurality of first colors of the first color scheme are a plurality of default colors.

12. The method of claim 8, wherein the plurality of second colors of the second color scheme are determined by a user.

13. The method of claim 8, the method further comprising providing a preview of recoloring the image from the first color scheme to the second color scheme via an interface.

14. The method of claim 8, the method further comprising:
voting for an overall representative color for the image, wherein, each time a first color is chosen as a representative color for a pixel of the image, the chosen first color receives a vote to be the overall representative color for the image, and whichever first color receives the most votes is determined to be the overall representative color for the image.

15. A system for recoloring a set of images of a web page, the system comprising:
a processor;
a memory coupled to the processor;
a receiving module that receives at least one image that is to be recolored from a first color scheme to a second color scheme, wherein the first color scheme comprises a plurality of first colors, the second color scheme comprises a plurality of second colors, and each of the plurality of first colors is associated to one of the plurality of second colors;
an assigning module that assigns a representative color to each of the pixels of the image, wherein the representative colors are chosen from the plurality of first colors; and
a recoloring module that recolors pixels of the image to correspond to the plurality of second colors, wherein each recolored pixel is recolored according to a second color that is associated with the representative color that was assigned to the recolored pixel.

16. The system of claim 15, wherein assigning a representative color to each of the pixels of the image comprises calculating color distances between a color of each pixel of the image and each color of the plurality of first colors, and wherein the first color that has the shortest color distance to a color of a pixel is determined to be the representative color of the pixel.

17. The system of claim 15, wherein recoloring pixels of the image to the plurality of second colors comprises calculating a luminance value of each pixel of the image, and wherein each recolored pixel is recolored in accordance to the luminance value of the pixel and the second color of the pixel.

18. The system of claim 15, wherein the plurality of first colors of the first color scheme are a plurality of default colors.

19. The system of claim 15, wherein the plurality of second colors of the second color scheme are determined by a user.

20. The system of claim 15, the system further comprising a providing module that provides a preview of recoloring the image from the first color scheme to the second color scheme via an interface.

* * * * *

UNITED STATES PATENT AND TRADEMARK OFFICE
CERTIFICATE OF CORRECTION

PATENT NO. : 8,731,289 B2
APPLICATION NO. : 13/633451
DATED : May 20, 2014
INVENTOR(S) : Straub It is certified that error appears in the above-identified patent and that said Letters Patent is hereby corrected as shown below:

In the Specification

Column 4, line 29, delete "Red Delta" and insert -- RedDelta --, therefor.

Column 4, line 29, delete "red Delta" and insert -- redDelta --, therefor.

Signed and Sealed this
Fourteenth Day of October, 2014

Michelle K. Lee
*Deputy Director of the United States Patent and Trademark Office*